Aug. 14, 1923.  1,464,617
H. S. PEED
EXTERNAL CONTRACTING BRAKE FOR AUTOMOBILES
Filed March 1, 1920
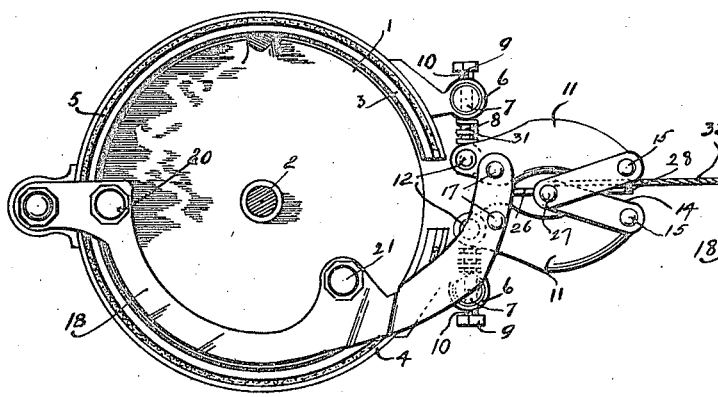
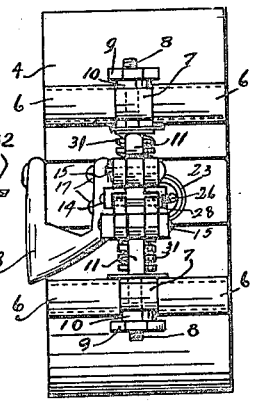
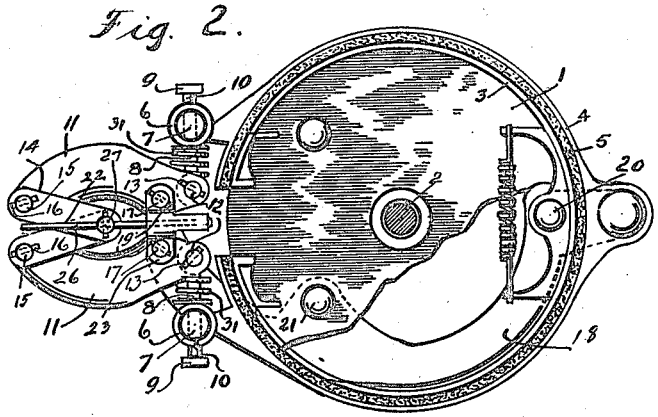
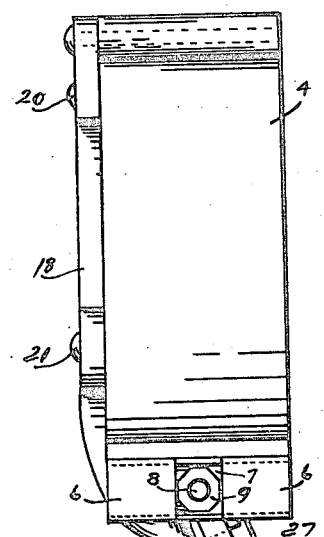
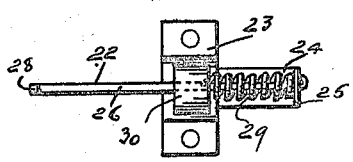
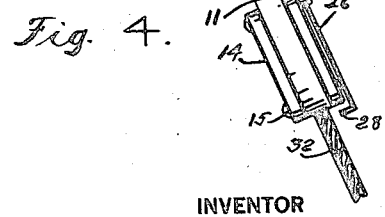
INVENTOR
Horace Seymour Peed.
BY
M. C. Gillham.
ATTORNEY Patented Aug. 14, 1923.

1,464,617

UNITED STATES PATENT OFFICE.

HORACE SEYMOUR PEED, OF KANSAS CITY, MISSOURI, ASSIGNOR, BY MESNE ASSIGNMENTS, TO JOHN H. NEFF, OF FORT LEAVENWORTH, KANSAS.

EXTERNAL CONTRACTING BRAKE FOR AUTOMOBILES.

Application filed March 1, 1920. Serial No. 362,461.

*To all whom it may concern:*

Be it known that I, HORACE SEYMOUR PEED, a citizen of the United States, residing at Kansas City, in the county of Jackson and State of Missouri, have invented a new and useful External Contracting Brake for Automobiles, of which the following is a specification.

My invention relates to external contracting brakes for automobiles, and the object of the invention is to provide an inexpensive and efficient external contracting brake which may be easily and quickly applied on the brake drum of standard automobile brakes, and having facility for adjustment adapted for correcting inequalities incident to wasting of the parts.

I attain this object by means of the mechanism illustrated in the accompanying drawings in which—Figure 1, is a side view of the standard automobile brake equipped with an external contracting brake embodying my invention. Figure 2, is a side view of the brake, partly broken away to disclose the attaching member and device attached thereon. Figure 3, is an end view of the device. Figure 4, is a top view of the device and showing the angularly disposed contacting levers and the toggle joint for turning the levers. Figure 5, is a plan view of the inner side of the housing of the limiting stop.

Similar numerals of reference refer to corresponding parts throughout the several views.

The brake housing 1, mounted on the spindle 2, and provided with brake drum 3, is fairly representative of the standard automobile contracting and expanding brake mechanism. The invention comprises a severed metal band 4, having the customary band of brake lining fabric 5, on its inner side. Journal bearings 6, are formed integral with the outer sides of the end portions of the band 4, and are disposed transversely thereof and spaced apart a suitable distance. Rock shafts 7, are journaled in the bearings 6, and holes are drilled transversely through the shafts between the inner ends of the bearings, through which holes, rods 8, are extended to and a little distance above the bearings and the upper ends of the rods are provided with external screw threads adapted for receiving nuts 9, having cylindrical portions 10, on their lower sides, which portions are flattened on opposite sides, so that the flattened portions shall closely abut the inner ends of the bearings and thereby lock the nuts and prevent their travelling on the rods. The lower ends of the rods 8, are flattened and the flattened portions provided with pivot holes which register with similar holes through the inner ends of levers 11, the latter being pivotally connected with the rods 8, by pivots 12, which are held in place by cotter pins 13 which pierce the projecting ends of the pins 12. Pivot holes are provided in the outer end portions of the levers 11, and a toggle joint 14, is connected between the levers and is held in place by pins 15, which are held in place by cotter pins 16. The levers 11, are pivotally mounted on studs 17, arranged for that purpose on an attaching member 18, and held in place by cotter pins 19 which pierce the end portions of the studs. The attaching member is fashioned to substantially conform to the contour of the lower half of the band 4, and to extend upwardly in a curved line to outwardly of the front side of the band and is provided with bolt holes for receiving the brake shoe bolt 20, and the lowermost radius rod bolt 21, on the brake housing, thereby positioning the studs 17, properly to receive the levers 11. A motion limiting stop 22, is also mounted on the end portions of the studs 17, and comprises a housing 23, having an extension 24, the end portion of which is turned inward to form a lip 25. A rod 26, is extended forwardly through the central pivot 27, of the toggle joint to a little in advance of the toggle, the outer end of the rod 26, is bent inward to form a toe 28, which is adapted for projecting before the toggle joint to arrest and detain the latter from opening far enough to assume a straight alignment. A retractile spring 29, is mounted on the inner end of the rod 26, and its inner end is attached on the spring and its outer end is connected with a plug 30, on the rod, the parts being so arranged that the toggle joint shall engage the toe 28, and draw the rod outward a distance calculated to allow the toe to arrest and detain the toggle, the reaction of the spring will draw the rod back to normal position. Compression springs 31, are mounted on the rods 8, and bear on the bearings 6, and on the inner ends of the levers 11.

To apply the device on the present brake housing, the attaching member 18, is secured thereon by removing the nuts from the brake shoe bolt and the lowermost radius bolt and entering the bolts mentioned in the holes in the member which are arranged to receive them. The band 4, is then placed in position on the brake drum and the levers 11 mounted on the studs 17, and then the toggle links are connected. The motion limiting device 22, is then mounted on the projecting ends of the studs and the cable 32, connected with the central pivot pin of the toggle joint and with the usual brake lever, not shown, on the automobile. If a pulling pressure is applied to the cable the toggle will open and straighten in the well known manner, until the toe on the rod 26 arrests the toggle. The straightening of the toggle as described effects a powerful pressure on the levers and the latter turn on the studs 17, the inner ends of the levers pulling on the ends of the brake band 4, thereby contracting the same and tightening the band on the brake drum.

Having described my invention what I claim is—

1. In an external contracting brake for automobiles, the combination with the brake housing having a brake drum, of a severed metal band provided with a band of brake lining fabric on its inner side, rock shafts mounted transversely on the outer side of the end portions of said band, rods loosely piercing said rock shafts between the bearings of the shafts and screw-threaded outer ends provided with nuts fashioned for locking with the rock shaft bearings, an attaching member mounted on the brake housing, levers pivoting on said attaching member and having their inner ends pivotally connected with said rods, a toggle joint pivoting on the outer ends of said levers and normally folded inwardly of the levers, and means for straightening said toggle joint to simultaneously turn said levers and effect the contracting of said brake band on the brake drum.

2. In an external contracting brake for automobiles, the combination with the brake housing having a brake drum, of a severed metal band provided with a band of brake lining fabric on its inner side, rock shafts mounted transversely on the outer side of the end portions of said band, rods loosely piercing said rock shafts between the bearings of the shafts and having screw-threaded outer ends provided with nuts fashioned for locking with the rock shaft bearings, an attaching member mounted on the brake housing, levers pivoting on said attaching member and having their inner ends pivotally connected with said rods, a toggle joint pivoting on the outer ends of said levers and normally folded inwardly of the levers, a motion limiting stop arranged at the side of said levers and adapted for adjustably limiting the straightening of said toggle joint, and means for straightening said toggle joint to simultaneously turn said levers and effect the contracting of said brake band on the brake drum.

3. In an external contracting brake, the combination with the brake drum, of a severed brake band loosely mounted on the brake drum, an attaching member mounted on the brake drum and having a bearing portion at the ends of the brake band, a lever pivoting on said attaching member and having its inner end associated with one end of said brake band, a lever aligned with said first mentioned lever and pivoting on said attaching member and having its inner end associated with the other end of said brake band, a toggle pivotally connected between the outer ends of said levers and normally flexed inwardly of the levers, and pulling means attached on said toggle for straightening the toggle and thereby turning said levers to contract said brake band on the brake drum.

4. In combination with a drum and a brake band operably associated with said drum, a supporting member, means connecting the rear portion of the brake band to said supporting member, a pair of levers fulcrumed at the forward end of said supporting member, means operably connecting said levers to the forward portion of the brake band for actuating the same, a toggle operably connected to said levers to actuate the same, means for moving said toggle to active position, an arm secured to the forward end of the supporting member, and a spring connected to said arm and the toggle to restore the latter to inactive position.

Dated Kansas City, Missouri, February 24th, 1920.

HORACE SEYMOUR PEED.

Witnesses:
    MASON F. SMITH, Jr.,
    EVERETT L. McKAY.